United States Patent
Stuart

(10) Patent No.: US 6,265,517 B1
(45) Date of Patent: Jul. 24, 2001

(54) SILYLATED POLYETHER SEALANT

(75) Inventor: Jonathan T. Stuart, Blue Bell, PA (US)

(73) Assignee: Bostik, Inc., Huntington Valley, PA (US)

( * ) Notice: Subject to any disclaimer, the term of this patent is extended or adjusted under 35 U.S.C. 154(b) by 0 days.

(21) Appl. No.: 09/390,875

(22) Filed: Sep. 7, 1999

(51) Int. Cl.$^7$ .................. C08G 77/18; C08G 18/10; C08G 18/38; C08L 83/06; C09D 183/06
(52) U.S. Cl. .................. 528/28; 528/26; 528/33; 528/38; 528/49; 528/59; 528/76
(58) Field of Search .................. 528/28, 33, 38, 528/26, 49, 59, 76

(56) References Cited

U.S. PATENT DOCUMENTS

| | | | |
|---|---|---|---|
| 3,033,815 | 5/1962 | Pike et al. | 528/38 |
| 4,067,844 | 1/1978 | Barron et al. | 525/453 |
| 5,364,955 | 11/1994 | Zwiener et al. | 556/418 |
| 5,866,651 | 2/1999 | Moren et al. | 524/588 |
| 5,908,948 | * 6/1999 | Roesler et al. | 556/421 |
| 5,945,476 | * 8/1999 | Roesler et al. | 524/588 |
| 5,952,445 | * 9/1999 | Roesler et al. | 528/28 |
| 6,005,047 | * 12/1999 | Shaffer et al. | 524/590 |
| 6,077,901 | * 6/2000 | Roesler et al. | 524/588 |
| 6,077,902 | * 6/2000 | Roesler et al. | 524/589 |

FOREIGN PATENT DOCUMENTS

| | | |
|---|---|---|
| 0596360 | 5/1994 | (EP) . |
| 0831108 | 3/1998 | (EP) . |
| 0864575 | 9/1998 | (EP) . |
| 9818843 | 5/1998 | (WO) . |
| 0026271 | 5/2000 | (WO) . |

OTHER PUBLICATIONS

Laurey, Bruce D. et al. High Performance Moisture–cured Systems based on Acclaim™ Polyether Polyols, Presented on Nov. 5, 1996, pp. 83–99.
Bayer, Desmoseal VP LS 2237; Jan. 13, 1997.

* cited by examiner

Primary Examiner—Rabon Sergent
(74) Attorney, Agent, or Firm—Proskauer Rose LLP

(57) ABSTRACT

The present invention relates to a silyated polyether urethane prepolymers prepared from endcap precursors containing dialkyl maleates having alkyl groups containing greater than four carbon atoms which is viscosity stable during compounding, exhibits a relatively fast cure rate, and which has improved sag resistance, extrusion rates, elongation, modulus, and tensile strength. Sealants containing such prepolymers and a process for preparing such sealants is also provided.

14 Claims, No Drawings

SILYLATED POLYETHER SEALANT

FIELD OF THE INVENTION

The present invention relates to an improved single-component, moisture-curable sealant containing alkoxysilane functional polyether urethanes prepared from at least one dialkyl maleate having alkyl groups containing from greater than four carbon atoms, and preferably from four carbon atoms to about thirteen carbon atoms. The inventive sealant is viscosity stable during compounding and has a relatively fast cure rate, yet provides improved sag resistance, extrusion rates, elongation, modulus, and tensile strength.

BACKGROUND OF THE INVENTION

Moisture-curable, single-component sealants are used to provide liquid and gaseous barriers in various applications. Such applications include bonding of dissimilar materials, sealing of expansion joints, assembling curtain walls and side walls, weatherproofing, constructing roofing systems, and sealing the perimeters around doors, windows and other building components (i.e., perimeter sealing). Weather proofing applications might include truck trailers, buses, recreational vehicles, and utility trailers. Dissimilar materials that may, for example, be sealed and bonded with the inventive sealants include cement-containing products, metals, plastics, glass, and composites of any of the foregoing. The inventive sealants may also be used, for example, for the maintenance and repair of trailers, recreational vehicles, and rail units. Commercially viable sealants strike an acceptable balance among mechanical and rheological properties, such as cure speed, shelf life, extrusion rate, sag resistance, elongation, modulus, tensile strength, adhesion to various surfaces, and thermal and ultraviolet light stability.

Two major moisture-curable, single-component sealant technologies have been found to be useful in such applications. These are silicone-based and urethane-based sealants. Silicone-based and urethane-based sealants each have many beneficial characteristics, yet each have different, but equally undesirable characteristics. The silicone-based sealants generally exhibit superior weather resistance, mechanical and rheological properties (e.g., elastic recovery), heat resistance and adhesion to a variety of substrates, and tend to be nonfoaming in high humidity. Even so, silicone-based sealants tend to be very difficult to compound due to the incompatibility of silicones with many sealant additives, to be unpaintable, to accumulate dirt and dust, and to contain fluids that stain porous substrates. In addition, silicone-based sealants containing alkoxy groups tend to cure slowly as they age in the package, resulting in short sealant shelf lives.

Urethane-based sealants generally exhibit superior mechanical and rheological properties, and adhere well to a variety of substrates, as do silicone-based sealants. Unlike silicone-base sealants, however, urethane-based sealants tend not to appreciably accumulate dust, tend to be relatively easy to compound as compared to silicone-based sealants, and tend not to stain substrates. Even so, urethane-based sealants generally discolor upon exposure to ultraviolet light, foam when cured in hot humid environments, and cannot accommodate large joint movements. In addition, while urethane-based sealants made using aliphatic isocyanates tend not to discolor, they tend to have relatively slow cure rates. Thus, sealants that maximize the beneficial characteristics of each technology, yet which minimize the undesirable characteristics are needed. These sealants are commonly referred to as "hybrids".

Hybrid sealants based on moisture-curable hydrolyzable alkoxysilane functional polyether urethane prepolymers have been proposed in an attempt to combine many of the beneficial properties of each of the urethane-based and silicone-based technologies, while avoiding or minimizing the undesirable properties of each technology. Such prepolymers contain both hydrolyzable silyl groups which crosslink by a silane polycondensation reaction in the presence of moisture, and other functional groups. Since moisture is typically present in the atmosphere, sealants containing these prepolymers may be referred to as "atmospheric-curable sealants." Hybrid sealants are typically made by compounding the moisture-curable alkoxysilane functional polyether urethane prepolymers with rheological modifiers, adhesion promoters, oxidative stabilizers, plasticizers, and cure catalysts.

The moisture-curable alkoxysilane functional polyether urethane prepolymers may be prepared by a variety of methods, including the reaction or addition of isocyanate functional polymers (i.e., polyether urethane polymers) with amino alkylalkoxysilanes. This reaction results in the termination of some or all pendant isocyanate groups of the polyether urethane prepolymer with the amino group of the amino alkylalkoxysilane. By way of definition, the termination of pendant isocyanate groups with the amino group of the amino alkylalkoxysilane is termed "end-capping," the resulting polymer is termed an "endcapped" or "silylated" polymer, and the molecule used to terminate the isocyanate groups is termed the "endcap". The polyether urethane prepolymer is generally prepared by reacting a polyol in the presence of a catalyst with an isocyanate to form the polyether urethane prepolymer.

Endcaps useful to terminate the isocyanate groups of polyurethane prepolymers containing the adduct of amino alkylalkoxysilanes and maleic acid esters having an alkyl group with less than four carbon atoms have been proposed. The amino groups utilized are primary amines, such as gamma-aminopropyltrimethoxysilane (hereinafter "APTMS"). APTMS must be used as a precursor when used as an endcap because APTMS has active hydrogen atoms that tend to associate with polar groups, such as urethane linkages in the prepolymer. These associations result in compounding difficulties like building of viscosity and slower cure times.

U.S. Pat. No. 5,364,955 (Zweiner et al.), U.S. Pat. No. 5,866,651 (Moren et al.), U.S. Pat. No. 3,033,815 (Pike et al.), and European Patent Application Nos. EP 0 831 108 A1 (Waldman et al.) and EP 0 864 575 A2 (Roesler et al.) disclose endcaps, including aspartic acid ester endcaps formed from maleic acid esters, and primary amino alkylalkoxysilanes. Specifically, these patents and applications disclose urethane prepolymers reacted with endcaps formed from dimethyl, diethyl, and/or dibutyl maleic acid esters and amino alkylalkoxysilanes. These patents and applications disclose that these endcaps may be prepared by an addition reaction, known as Michael addition, of the amino alkylalkoxysilane with the beta-olefinic carbon atom of the dimethyl, diethyl and/or dibutyl maleic acid ester.

Sag resistance and elongation tend to be low, and extrusion rates and tensile strength tend to be high for conventional dialkyl maleate endcaps. None of the above patents and patent applications discloses dialkyl maleic acid ester endcap precursors having alkyl groups containing more than four carbon atoms.

In addition, conventional endcapped polyurethane prepolymers may utilize polyether diols or triols. Polyether diols conventionally used typically have relatively low molecular weights. This is believed to be because conventional polyether diols having higher molecular weights, for example, molecular weights of 6000 or higher, tend to have undesirably high monol contents. While the presence of at least some monol is typically unavoidable in polyether diols, a relatively high monol content is highly undesirable because monols react with isocyanates thereby reducing crosslinking and curing of the prepolymer. Thus, conventional polyether diols are generally commercially available having only relatively low molecular weights.

Conventional polyether diols typically have, for example, monol contents of about 6% by weight for a polyether diol of about 2000 molecular weight, and of about 31% by weight for a polyether diol of about 4000 molecular weight. Lawry, B. D. et al., "High Performance Moisture-Cured Systems Based in Acclaim Polyether Polyols", presented at The Adhesives and Sealant Council's 1996 Int'l Conference, San Francisco, Calif., Nov. 5, 1996. For example, typically polyether diols having molecular weights of only about 2000 are used. Conventional polyether diols having higher molecular weights of about 4000 tend to have poor cure rates or do not cure. Even conventional diols with lower molecular weights unavoidably have some amounts of undesirable monols. Using lower molecular weight diols, while having the advantage of lowering the monol content and improving the cure rate, necessitates using more isocyanates and accordingly more amino alkylalkoxysilanes which are expensive.

U.S. Pat. No. 5,866,651 (Moren et al.) and European Patent Application Nos. EP 0 831 108 Al (Waldman et al.) disclose endcapped polyether urethane prepolymers made from conventional polyether diols having relatively low molecular weights. In particular, U.S. Pat. No. 5,866,651 teaches using ethylene oxide and propylene oxide having average molecular weights ranging from about 2000 to about 8000, and more preferably from about 3000 to about 6000. European Patent Application No. EP 0 831 108 A1 teaches using polypropylene glycols with average molecular weights ranging from 500 to 6000, and more narrowly from 1000 to 4000. None of these teaches using polyether diols having average molecular weights of from about 6000 to about 20000, and more preferably from about 8000 to about 12000. In addition, none of these teaches a monol content of any kind. Even further, none of U.S. Pat. No. 5,364,955 (Zweiner et al.), U.S. Pat. No. 5,866,651 (Moren et al.), U.S. Pat. No. 3,033,815 (Pike et al.), and European Patent Application Nos. EP 0 831 108 A1 (Waldman et al.) and EP 0 864 575 A2 (Roesler et al.) teach a sealant having alkyl groups with more than four carbon atoms and high molecular weight, low monol content polyols.

What is desired therefore is a single-component, moisture-curable prepolymer and sealant containing silylated polyether urethane prepolymers prepared from the adduct of at least one dialkyl maleic acid ester having alkyl groups containing more than four carbon atoms and a primary amino alkylalkoxysilane to form a single-component, moisture-curable sealant. What is further desired is a single-component, moisture-curable prepolymer and sealant containing silylated polyether urethane prepolymers prepared from such adducts and reacted with polyether diols having relatively high molecular weights and relatively low monol contents. What is even further desired is a prepolymer and sealant as described above having improved mechanical and rheological properties.

SUMMARY OF THE INVENTION

Accordingly, it is an object of the invention to provide a silylated polyether urethane to prepolymer prepared from the adduct of at least one dialkyl maleic acid ester having alkyl groups containing more than four carbon atoms and a primary amino alkylalkoxysilane having improved mechanical and Theological properties, yet which is relatively viscosity stable, and which has a relatively fast cure rate.

Another object of the invention is to provide a silylated polyether urethane prepolymer prepared from (1) an endcap formed from the adduct of at least one dialkyl maleic acid ester having alkyl groups containing more than four carbon atoms and a primary amino alkylalkoxysilane, and (2) a polyether urethane prepolymer formed from a relatively high molecular weight polyol, having a relatively low monol content.

A further object of the invention is to provide a single-component, moisture-curable sealant containing at least one silylated polyether urethane prepolymer having the above characteristics.

Still yet another object of the invention is to provide a sealant containing the silylated prepolymer, said sealant having further improved mechanical and Theological properties, yet which is relatively viscosity stable, and which has a relatively fast cure rate.

Even still yet another object of the invention is to provide a process for making sealants having the above characteristics.

Other objects of the invention will be obvious and may in part appear hereinafter.

These and other objects are achieved by provision of a silylated polyether urethane prepolymer formed from the adduct of (1) at least one polyurethane prepolymer and (2) the adduct of a primary amino alkylalkoxysilane and a dialkyl maleic acid ester having alkyl groups containing more than four carbon atoms, wherein the polyurethane prepolymer is formed from a polyether diol having a number average molecular weight of about 8,000 to 9,000 and a monol content of less than 31 mole %.

These and other objects are further achieved by the provision of a moisture-curable sealant comprising a homogeneous blend of (a) from about 5 to about 40% by weight of at least one silylated polyether urethane prepolymer formed from the adduct of (1) at least one polyurethane prepolymer and (2) the adduct of a primary amino alkylalkoxysilane and a dialkyl 5 maleic acid ester having alkyl groups containing more than four carbon atoms, (b) from about 5 to about 30% by weight of at least one plasticizer, (c) from about 10 to about 60% by weight of at least one filler, (d) from about 0.5 to about 10% by weight of at least one thixotrope, and (e) from about 0.1 to about 5% by weight of at least one additive.

The objects of the invention are also achieved by the provision of a single-component, moisture-curable sealant comprising a homogeneous blend of (a) from about 5 to about 40% by weight of at least one silylated polyether urethane prepolymer formed from the adduct of (1) at least one polyurethane prepolymer formed from a polyether diol having a molecular weight of at least about 8000 and a monol content no greater than about 31% and (2) the adduct of a primary amino alkylalkoxysilane and a dialkyl maleic acid ester having alkyl groups containing more than four carbon atoms, (b) from about 5 to about 30% by weight of at least one plasticizer, (c) from about 10 to about 60% by weight of at least one filler, (d) from about 0.5 to about 10% by weight of at least one thixotrope, and (e) from about 0.1 to about 5% by weight of at least one additive.

The invention and its particular features will become more apparent from the following detailed description considered with reference to the accompanying examples.

DETAILED DESCRIPTION OF THE INVENTION

A. Sealant Formula

Sealants of the invention contain silylated polyether urethane prepolymers having hydrolyzable silyl groups or endcaps which are reacted to pendant isocyanate groups of a polyether urethane prepolymer. The reaction of the endcap to the pendant isocyanate groups results in a sealant having many of the beneficial properties of urethane-based and silicone-based sealant technologies.

Sealants in accordance with the invention contain a homogeneous blend of at least one silylated polyurethane prepolymer, at least one plasticizer, at least one filler, at least one thixotrope, and at least one additive. Prepolymers are present in an amount from about 5 to about 40% by weight. Plasticizers are present in an amount of from about 5 to about 30% weight. Fillers are present in an amount of from about 10 to about 60% by weight. Thixotropes are present in the amount of from about 0.5 to about 10% by weight. Additives are present in the amount of from about 0.1 to about 5% by weight.

Plasticizers suitable for the invention include any one of the following or combination thereof: phthalates, adipates, sebacates, azelates, trimellitates, glutarates, benzoates, alkyl alcohols, and phosphates. Fillers suitable for the invention include any one of the following or combination thereof: pigments, ground calcium carbonates, precipitated calcium carbonates, clays, silicas, talc and mica. Thixotropes suitable for the invention include any one of the following or combination thereof: polyamides, castor oil derivatives, plastisols, silicas, microgels, and urea gels. Additives suitable for the invention include any one of the following or combination thereof: adhesion promoters, ultra violet light stabilizers, anti-oxidants, catalysts, Theological modifiers, biocides, corrosion inhibitors, dehydrators, organic solvents, colorants, and perfumes as desired.

B. Silylated Polyether Urethane Prepolymer Formula

The silylated polyether urethane prepolymer is the adduct of at least one amino alkylalkoxysilane endcap precursor, and at least one polyether urethane prepolymer. Preferably, the ratio of equivalents of terminal isocyanate groups of the prepolymer to the endcap precursor is approximately 1:1, but can range from about 0.5:1 to about 1.5:1.

The polyether urethane prepolymer is the adduct of at least one polyol, at least one diisocyanate, and, preferably, at least one catalyst. U.S. Pat. No. 5,866,651 and U.S. Pat. No. 5,364,955 teach a formula and method for making polyether urethane prepolymers suitable for the invention, and are hereby incorporated by reference. The ratio of equivalents of isocyanate to polyol ranges from about 1.3:1 to about 2.0:1, and more preferably from about 1.4:1 to about 1.6:1. Preferably, up to about 5% by weight of a catalyst is used based on the isocyanate weight. Most preferably, from about 0.008 to about 0.4 % by weight of the catalyst is used. Tin catalysts known to those skilled in the art are preferred, however, other catalysts known to those skilled in the art may be used.

Isocyanates particularly useful in the preparation of the polyether polyurethane prepolymer are aromatic or aliphatic diisocyanates. The selection of the diisocyanate influences the viscosity of the prepolymer, and is known to those skilled in the art. Representative examples of useful isocyanates include methane diphenylisocyanate (hereinafter "MDI"), toluene diisocyanate, isophorone diisocyanate (hereinafter "IPDI"), hexamethylene diisocyanate, hydrogenated methane diphenylisocyanate, tetramethylxylene diisocyanate, polymethylene phenylene isocyanate, allophanates of any of the foregoing, biurets of any of the foregoing, and adducts of any of the foregoing. Any one or combination of the above-listed diisocyanates may be used. Preferably, IPDI and/or MDI are used, and most preferably, IPDI is used.

Polyols useful in the preparation of the urethane prepolymers are isocyanate reactive polyols which can be diols or triols, however, preferably, polyether diols are used. Representative examples of useful polyols include polyoxypropylene polyol, polyalkylene polyol, and polypropylene glycols. Preferably, polyether diols having very high molecular weights and very low monol contents are used. For example, polyether diols with molecular weights ranging from greater than about 6000 to about 12000 and monol contents of less than about 31% may be used. Most preferably, polyether diols having molecular weights ranging from greater than about 8000 to about 9000, and monol contents of less than about 31% are used. While not wishing to be bound by any theory, it is now believed that polyether diols having high molecular weight and low monol content, tend to minimize monol reactions with the isocyanate functional group thereby maximizing crosslinking and cure rates, and tend to maximize the reactivity of the isocyanate group while imparting sufficiently high molecular weight and viscosity to the resultant prepolymer and sealant. Most preferably a polyether diol having a molecular weight of about 8000 and a monol content of about 4% is used. Numerous polyether diols are commercially available and are disclosed in U.S. Pat. No. 5, 866,65 1. A particularly preferred polyether diol is a polyoxypropylene sold under the tradename AcclaiMmT and available from Lyondell Chemicals.

The preferred polyether diols may be provided in many forms. As discussed above, they can be provided in various molecular weights and flinctionality (i.e., the amount of reactive groups per molecule) within a chemical classification. The polyether diols useful in the invention may be modified by end-capping or tipping with ethylene oxide, which tends to increase the number of primary hydroxide groups, and may also be modified by acidifying the polyol.

C. Amino Alkylalkoxysilane Endcap Precursor Formula

Endcap precursors of the invention comprise the adduct of at least one dialkyl maleic acid ester having alkyl groups containing more than four carbon atoms, and at least one amino alkylalkoxysilane. It is now believed that the presence of dialkyl maleates having alkyl groups containing greater than four carbon atoms tends to function as an internal plasticizer. By way of definition, "higher dialkyl maleic acid esters" and "higher dialkyl maleates" mean dialkyl maleic acid esters and dialkyl maleates, respectively, having alkyl groups containing greater than four carbon atoms. Accordingly, endcap precursors containing higher dialkyl maleic acid esters are now believed to lower the rigidity of the resulting sealant and prepolymers (i.e., lower modulus) and to improve the tensile strength, sag resistance and extrusion rate of the sealant. A ratio of equivalents of from about 0.5:1 to about 1.5:1, and preferably from about 0.9:1 to about 1.1:1 of higher dialkyl maleic acid esters to amino alkoxysilanes is typically used. Higher dialkyl maleates useful in the preparation of the endcap precursor include, for example, dimethylamyl maleate, dioctyl maleate, diisononyl maleate, and ditridecyl maleate. It is understood, however, that higher dialkyl homologs of maleic acid ester adducts, may also be used, such as fumaric acid esters and cinnamic acid esters. Most preferably, dioctyl maleate is used.

The amino alkylalkoxysilanes may be any primary amino alkylalkoxysilane known to those skilled in the art. U.S. Pat. No. 5,364,955, U.S. Pat. No. 3,033,815 and U.S. Pat. No. 5,866,651 teach useful amino alkylalkoxysilanes. U.S. Pat. No. 3,033,815 and U.S. Pat. No. 5,866,651 are hereby incorporated by reference. Representative examples of useful amino alkylalkoxysilanes include 3-aminopropyltrimethoxysilane, 3-aminopropyltriethoxysilane, 3-aminopropyl-methyl-diethoxysilane, and 3-aminopropyl-methyl-dimethoxysilane. The following amines may also be useful aminoethylamino-propyltrimethoxy silane, 3-aminoethylaminoethylamino-propyltrimethoxy silane, 3-aminoethylamino-propyltriethoxy silane, 3-aminoethylaminoethylamino-propyltriethoxy silane, 3-aminopropylmethyl-dimethoxy silane, and 3-aminopropylmethyldiethoxy silane. Most preferably, 3-aminopropyltrimethoxysilane is used. Numerous amino alkylalkoxysilanes are commercially available. A particularly preferred amino alkylalkoxysilane is Silquest A-111 available from Witco.

Most preferably, the endcap precursor formed from dioctyl maleate and aminopropyltrimethoxysilane is used.

D. Preparation of Polyether Urethane Prepolymer, Endcap Precursor, Silylated Polvether Urethane Prepolymer, and Silylated Polvether Sealant The polyether urethane prepolymer is prepared by first reacting at least one polyol, at least one diisocyanate and at least one catalyst using methods known to those skilled in the art, and as disclosed in U.S. Pat. No. 5,364,955, and U.S. Pat. No. 5,866,651. Preferably, the endcap precursor is prepared, in a separate reactor, by reacting at least one higher dialkyl maleate and at least one aminoalkylalkoxysilane according to a Michael addition reaction known to those skilled in the art, and as taught by U.S. Pat. No. 3,033,815, U.S. Pat. No. 5,364,955, U.S. Pat. No. 5,866,651 and by any organic chemistry text. Specifically, polyether urethane prepolymers useful in the invention are reacted between about 120° F. and about 130° F. in a moisture-free reactor with a tin catalyst for about 120 minutes.

The silylated polyether urethane prepolymer is prepared by reacting the endcap precursor with the prepolymer, preferably after the prepolymer has fully formed. The silylated prepolymer may also be prepared by mixing the polyols, isocyanates, catalysts and endcap precursors together and allowing them to react according to methods known to those skilled in the art. Specifically, the silylated polyether urethane prepolymers useful in the invention are reacted between from about 120° F. and about 130° F. in a moisture-free reactor for about 45 minutes.

The amino groups of the endcap precursor react with the pendant isocyanate groups of the prepolymer to form urea and urethane segments in the silylated prepolymer. The resulting silylated prepolymer has an average molecular weight ranging from about 10,000 to about 20,000, and most preferably from about 17,000 to about 18,000, and a viscosity ranging from about 1,500 to about 75,000 centipoise and most preferably from about 20,000 to about 40,000 centipoise at about 75° F.

Sealants in accordance with the invention are formed by compounding the silylated prepolymers with the plasticizers, fillers, thixotropes and additives as described above, in proportions as described above using compounding methods known to those skilled in the art. Specifically, sealants in accordance with the invention may be compounded by mixing the fillers and plasticizers together and then removing excess moisture by methods known to those skilled in the art, such as by desiccating, to form a paste-like charge. The charge is then mixed with the prepolymer and thixotrope for about 45 minutes at between about 180° F. and about 190° F. The additives and catalysts are then added to the mixture which is mixed using conventional equipment until homogeneous to form a sealant in accordance with the invention. The sealant is then packaged in moisture impermeable containers.

Preferred sealants for construction and industrial applications have shelf lives which allow for packaging and sale of the sealant (i.e., do not cure before they are used). The preferred sealants also exhibit less than or equal to 0.3 inches of sag (i.e., sag resistance), an extrusion rate of greater than or equal to 100 grams per minute, 100% modulus of 80 psi or less, tensile strength of 125 psi or greater, and % elongation of 500 or greater. Other sealant formulations may be useful for other sealant applications within the scope of the invention to provide a sealant having slightly modified mechanical and Theological properties.

Prepolymers and, accordingly, sealants comprising an Acclaim™ 8200 polyol and a dioctylmaleate endcap precursor as described in the examples below are preferred, and most preferably prepolymers and sealants comprised of the Acclaim™ 8200™ polyol, the dioctyl maleate endcap precursor and IPDI are used.

E. Use In Industrial Applications

Sealants having the above characteristics are used in industrial applications, such as for sealing panels of trailer bodies gain liquid and moisture vapor, and providing for imparting additional mechanical support. Upon application, the sealants of the invention exhibit increased extrusion rates and sag resistance, and upon crosslinking the sealants of the invention exhibit improved modulus, tensile strength, and elongation over conventional sealants.

The invention is further illustrated by the following examples, but the particular materials and amounts thereof recited in these examples, as well as other conditions and details, should not be construed to unduly limit this invention.

EXAMPLES

A. Test Methods

The following test methods were used to obtain the results reported in this specification and the following examples.

Sag Resistance. Sag resistance was measured using ASTM D 2202-88 and correlates with the degree of slump of an uncured sealant composition when used in a vertical joint in a structure.

Extrusion Rate. Extrusion rate was measured using ASTM C603-83 modified by using a nozzle having a ⅛" orifice and represents the ability of the uncured sealant composition to be extruded through a sealant applicator gun, which may be referred to as "gunnability".

100% Modulus. 100% Modulus was measured using ASTM 412-83 and represents the strength of the specimen at 100% elongation.

Tensile Strength. Tensile strength was measured using ASTM 412-83 and represents the force required to break the specimen, or the ultimate strength of the specimen at just prior to breaking.

Elongation. % elongation was measured using ASTM 412-83 and represents the length of the specimen relative to its starting length just prior to breaking.

Viscosity. Viscosity was measured using a Brookfield viscometer, model RVT, using a #6 spindle and measured at 20 RPM.

% by Weight. Percentages given in the following examples are weight percentages.

| Tradename | Generic Name/Composition (Source) |
|---|---|
| The following table provides information concerning relevant commercial materials. | |
| Silquest A-1110 | Aminopropyltrimethoxysilane (Witco, formerly OSi Specialties) |
| Silquest Y-9669 | N-phenyl-gamma-aminopropyltrimethoxysilane (Witco, formerly OSi Specialties) |
| Silquest Y-15052 | Adduct of dibutylmaleate and 4-amino-3,3-dimethylbutyltrimethoxysilane (Witco, formerly Osi Specialties) |
| Acclaim 8200 | 8000 molecular weight polypropylene oxide polyol having a monol content of about 4% (Lyondell Chemical) |
| Acclaim 4200 | 4000 molecular weight polypropylene oxide polyol having a monol content of about 2% (Lyondell Chemical) |
| PPG 2025 | 2000 molecular weight polypropylene glycol polyol having monol content of about 6% (Lyondell Chemical) |
| PPG 4025 | 4000 molecular weight polypropylene polyol having monol content of about 31% (Lyondell Chemical) |

C. General Procedure for Formation of Endcap Precursors

The amino alkylalkoxysilane and dialkyl maleates in the amounts listed in Table 1 were mixed together under nitrogen purge for about 30 minutes at ambient conditions to form the endcap precursors in accordance with the invention.

TABLE 1

| Example | Endcap Precursor* | Number of Carbons in Alkyl Groups | Encap Precursor (% by weight) Dialkyl Maleate | Formulation Organosilane |
|---|---|---|---|---|
| 1 | Diethyl maleate (DEM) | 2 | diethyl maleate 42.7 | Silquest A-1110 57.3 |
| 2 | Dibutyl maleate (DBM) | 4 | dibutyl maleate 54.8 | Silquest A-1110 45.2 |
| 3 | Dioctyl maleate (DOM) | 8 | dioctyl maleate 64.4 | Silquest A-1110 35.6 |
| 4 | Ditridecyl maleate (DTDM) | 13 | ditridecyl maleate 71.8 | Silquest A-1110 28.2 |
| 5 | Diisononyl maleate (DINM) | 9 | diisononyl maleate 66.2 | Silquest A-1110 33.8 |
| 6 | Dimethyl-amyl maleate (DMAM) | 6 | dimethyl-amyl maleate 60.1 | Silquest A-1110 39.9 |

*The dialkyl maleates used were obtained from C. P. Hall, Inc. (i.e., STAFLEX ® DEM, STAFLEX ® DBM, STAFLEX ® DOM, STAFLEX ® DTDM, STAFLEX ® DINM, and STAFLEX ® DMAM, respectively).

D. General Procedure for Formation of Silylated Polyether Urethane Prepolymers At least one polyol, isocyanate and catalyst in Table 2 below were first reacted, in the amounts listed in Table 2, to form a prepolymer by reacting for about 120 minutes at between about 120° F. and about 130° F. in a moisture-free reactor. The corresponding endcap precursor listed in Table 2 was prepared according to the appropriate example given in Table 1, and then added, in the amounts indicated in Table 2, to the prepolymer to form endcapped (i.e., silylated) polyether urethane prepolymers in accordance with the invention.

TABLE 2

| Example | Polyol (wt %) | Isocyanate (wt %) | Catalyst (wt %) | Endcap Precursor (wt %) |
|---|---|---|---|---|
| 7 | PPG 4025 80.4 | IPDI 7.1% | Tin Catalyst 0.008 | DOM 12.5 |
| 8 | PPG 4025 82.6 | IPDI 7.3 | Tin Catalyst 0.008 | DBM 10.1 |
| 9 | Acclaim 8200 90.5 | IPDI 4 | Tin Catalyst 0.008 | DBM 5.5 |
| 10 | Acclaim 8200 88.8 | IPDI 3.94 | Tin Catalyst 0.008 | DOM 7.26 |
| 11 | Acclaim 4200 80.6 | IPDI 7.0 | Tin Catalyst 0.008 | DOM 12.3 |
| 12 | Acclaim 8200 89.9 | IPDI 4.0 | Tin Catalyst 0.008 | Silquest Y-15052 6.1 |
| 13 | PPG 2025 73.3 | IPDI 13.0 | Tin Catalyst 0.008 | DEM 14.0 |
| 14 | PPG 2025 67.2 | IPDI 12.0 | Tin Catalyst 0.008 | DOM 20.9 |
| 15 | PPG 2025 70.3 | IPDI 12.5 | Tin Catalyst 0.608 | DBM 17.2 |
| 16 | Acclaim 8200 87.1 | IPDI 3.87 | Tin Catalyst 0.008 | DTDM 9.04 |
| 17 | Acclaim 8200 84.2 | IPDI 3.7 | Tin Catalyst 0.008 | DINM 12.1 |
| 18 | Acclaim 8200 89.5 | IPDI 3.97 | Tin Catalyst 0.008 | DMAM 6.52 |
| 19 | Acclaim 8200 91.6 | IPDI 4.1 | Tin Catalyst 0.008 | DEM 4.4 |
| 20 | Acclaim 8200 90.0 | MDI 4.2 | Tin Catalyst 0.008 | DOM 5.8 |

E. General Procedure for Formation of Silylated Polyether Sealants

Sealants were compounded by using approximately 27% by weight of the silylated prepolymer, 22.2% by weight DIDP plasticizer, 4.7% by weight titanium dioxide, 18.0% by weight precipitated calcium carbonate, 24.8 % by weight ground calcium carbonate, 1.8% by weight of a polyamide, 0.3% by weight of a light stabilizer, 1.0% by weight of an adhesion promoter, and 0.15% by weight of a tin catalyst. The precipitated calcium carbonate used was Thixocarb 500 available from Specialty Minerals, Inc., and the polyamide thixotrope used was Cray Vallac Super, available from Cray Valley Inc. The MDI used was Mondur ML, available form Bayer, Inc., and the IPDI used was Desmodur I, available from Bayer, Inc.

The plasticizers and fillers (i.e., titanium dioxide, precipitated calcium carbonate, and ground calcium carbonate) used were eliminated of moisture by desiccation so as to form a paste-like charge. The paste-like charge was mixed with the prepolymer and thixotrope (i.e., the polyamide). This composition was mixed for about 45 minutes at a temperature of between about 180° F. to about 190° F. The additives (i.e., light stabilizer, adhesion promoter and tin catalyst) were then added to the composition and mixed until a homogeneous mixture was formed. The resulting mixture, or sealant, was then placed in sealant packages. The resulting sealant had the properties shown in each of the Examples in Table 3.

TABLE 3

| Example | Sag (inches) | Extrusion Rate (g/min) | Modulus 100% (psi) | Tensile Strength (psi) | Elongation (%) | Comments |
|---|---|---|---|---|---|---|
| 7 | N/A | N/A | N/A | N/A | N/A | uncured |
| 8 | N/A | N/A | N/A | N/A | N/A | uncured |
| 9 | 0.9 | 181.1 | 90 | 190 | 490 | |
| 10 | 0.15 | 207.9 | 62 | 160 | 630 | |
| 11 | 3.00 | 350 | 102 | 140 | 220 | slow curing |
| 12 | 1.0 | 191.2 | 48 | 170 | 770 | |
| 13 | 1.50 | 233.9 | N/A | 170 | 80 | |
| 14 | 0.9 | 331.6 | 160 | 162 | 102 | |
| 15 | 0.45 | 537 | N/A | 200 | 85 | |
| 16 | 0.1 | 176.9 | 55 | 155 | 680 | |
| 17 | 0.15 | 257.1 | 55 | 140 | 600 | |
| 18 | 0.2 | 256.7 | 45 | 150 | 800 | |
| 19 | 0.4 | 120.8 | 95 | 200 | 430 | |
| 20 | 0.2 | 127.5 | 77 | 255 | 815 | |
| Preferred Properties | <0.3 | >100 | <80 | >125 | >500 | |

N/A means that no tests could be performed since the sample could not either be made or extended 100% so as to measure modulus.

All the sealants utilizing higher dialkyl maleates and polyols having a relatively high molecular weight and a relatively low monol content (i.e., Examples 10, 16, 17, 18 and 20) had sufficiently stable viscosities, sufficiently fast cure times, and exhibited improved sag resistance, extrusion rates, 100% modulus, tensile strength and elongation over sealants containing conventional polyols (i.e., Examples 8, 13 and 15) and endcap precursors formed from diethyl or dibutyl maleates, and over sealants containing conventional sealants and DOM (i.e., Examples 7 and 14). It should be noted that, while samples utilizing MDI had lower extrusion rates than those made with IPDI, sealants made using MDI are suitable for some applications.

The sealant utilizing Acclaim™ 8200 and DOM (i.e., Example 10) is preferred for construction and industrial applications as it yielded significantly improved sag resistance, extrusion rates, elongation, modulus and tensile strength, as shown in Table 3. Other formulations using higher dialkyl maleates and high molecular weight polyols having low monol content in accordance with the present invention, such as those in Examples 16, 17, 18, and 20, may be suitable for other applications.

Notably, as can be seen by comparing Examples 7 and 8 with Examples 10 and 13–18 and 20 of Table 3, sealants using prepolymers prepared from conventional polyols having relatively high molecular weights, and accordingly relatively high monol contents, either did not cure or were slow curing. It should also be noted that sealants using conventional PPG 4025 polyol with DEM, DMAN, DINM and DTDM did not cure.

Although the invention has been described by reference to the foregoing specific examples for the purpose of illustration, it is to be understood that such detail is solely for that purpose and that numerous alternatives will be apparent to those skilled in the art, and are considered to be within the scope of the invention.

What is claimed is:

1. A single-component, moisture-curable sealant comprising a homogeneous blend comprised of the following components based on the weight of the sealant:

(a) from about 5 to about 40% by weight of at least one silylated polyether urethane prepolymer formed from the adduct of at least one polyurethane prepolymer containing at least one polyol having a number average molecular weight ranging from about 8000 to about 9000 and a monol content of less than 31 mole %, and an endcap precursor, the endcap precursor being formed from a primary amino alkylalkoxysilane and a dialkyl maleic acid ester, wherein the alkyl groups of the dialkyl maleic acid ester are the same and each contains more than four carbon atoms;

(b) from about 5 to about 30% by weight of at least one plasticizer;

(c) from about 10 to about 60% by weight of at least one filler;

(d) from about 0.5 to about 10% by weight of at least one thixotrope; and (e) from about 0.1 to about 5% by weight of at least one additive.

2. The sealant according to claim 1 wherein the endcap precursor is comprised of at least one dialkyl maleate having alkyl groups containing from more than four carbon atoms to thirteen carbon atoms.

3. The sealant according to claim 1 wherein the alkyl groups of the dialkyl maleic acid ester have from six to thirteen carbon atoms.

4. The sealant according to claim 1 wherein the dialkyl maleic acid ester is a material selected from the group consisting of dimethylamyl maleate, dioctyl maleate, diisononyl maleate, and ditridecyl maleate.

5. The sealant according to claim 4 wherein the dialkyl maleate is dioctyl maleate.

6. The sealant according to claim 5 wherein the amino alkylalkoxysilane is a material selected from the group consisting of 3-aminopropyltrimethoxysilane, 3-aminopropyl triethoxysilane, 3-aminopropylmethyldiethoxysilane, and 3-aminopropylmethyl dimethoxysilane.

7. The sealant according to claim 6 wherein the amino alkylalkoxysilane is amino propyltrimethoxysilane.

8. The sealant according to claim 1 wherein the polyol has a number average molecular weight of about 8000 and a monol content of about 4 mole %.

9. The sealant according to claim 8 wherein the prepolymer further comprises a diisocyanate.

10. The sealant according to claim 9 wherein the diisocyanate is a material selected from the group consisting of isophorone diisocyanate, hexamethylene diisocyanate, methane diphenylisocyanate, toluene diisocyanate, hydrogenated methane diphenyl isocyanate, tetramethylxylene diisocyanate, polymethylene phenylene isocyanate, allophanates of any of the foregoing, biurets of any of the foregoing and adducts of any of the foregoing, and mixtures thereof.

11. The sealant according to claim 10 wherein the diisocyanate is isophorone diisocyanate.

12. The sealant according to claim 1 wherein said sealant has
   (a) less than or equal to 0.3 inches of sag;
   (b) an extrusion rate of greater than or equal to 100 grams per minute;
   (c) a 100% modulus of 80 psi or less;
   (d) a tensile strength of 125 psi or greater; and
   (e) an elongation of 500% or greater.

13. A process for making a single-component, moisture-curable sealant comprising the step of compounding at least one silylated polyether urethane prepolymer, at least one plasticizer, at least one filler, at least one thixotrope, and at least one additive to form a sealant according to claim 12.

14. A process for making a single-component, moisture-curable sealant comprising the step of compounding at least one silylated polyether urethane prepolymer, at least one plasticizer, at least one filler, at least one thixotrope, and at least one additive to form a sealant blend according to claim 1.

* * * * *